(12) United States Patent
Labey

(10) Patent No.: US 10,382,381 B2
(45) Date of Patent: Aug. 13, 2019

(54) GRAPHICAL USER INTERFACE FOR SIMULTANEOUS USE BY REMOTE USERS EACH HAVING CORRESPONDING PICTOGRAMS IN A VIRTUAL SPACE OF THE GRAPHICAL USER INTERFACE, METHOD, COMPUTER PROGRAM AND CORRESPONDING STORAGE MEDIUM

(75) Inventor: Mathieu Nicolas Labey, Brignais (FR)

(73) Assignee: GLOWBL, Lyons (FR)

( * ) Notice: Subject to any disclaimer, the term of this patent is extended or adjusted under 35 U.S.C. 154(b) by 163 days.

(21) Appl. No.: 14/423,243

(22) PCT Filed: Aug. 28, 2012

(86) PCT No.: PCT/IB2012/001819
§ 371 (c)(1),
(2), (4) Date: Feb. 23, 2015

(87) PCT Pub. No.: WO2014/033494
PCT Pub. Date: Mar. 6, 2014

(65) Prior Publication Data
US 2015/0256501 A1     Sep. 10, 2015

(51) Int. Cl.
*H04L 12/58*     (2006.01)
*H04L 29/08*     (2006.01)
(Continued)

(52) U.S. Cl.
CPC ............ *H04L 51/32* (2013.01); *G06F 3/0486* (2013.01); *G06F 3/04815* (2013.01); *H04L 67/00* (2013.01); *H04W 4/21* (2018.02)

(58) Field of Classification Search
CPC ..... G06N 3/006; G06F 3/04815; H04N 7/147
See application file for complete search history.

(56) References Cited

U.S. PATENT DOCUMENTS 5,694,561 A * 12/1997 Malamud .............. G06F 3/0481
715/805
6,247,019 B1 * 6/2001 Davies ................... G01C 21/32
340/989

(Continued)

FOREIGN PATENT DOCUMENTS

EP     2237533 A1     10/2010

OTHER PUBLICATIONS

International Search Report and Written Opinion for PCT/IB2012/001819.

*Primary Examiner* — Li P Sun
*Assistant Examiner* — Qi Wan
(74) *Attorney, Agent, or Firm* — McClure, Qualey & Rodack, LLP

(57) ABSTRACT

The invention provides a graphical user interface which can be used simultaneously by remote users each having at least one display screen, said graphical user interface comprising a virtual space (1) as well as a plurality of pictograms (2, 3 ... N) respectively associated with each of said users, each pictogram being designed to appear in said virtual space (1) and disappear therefrom under the control of the user with whom it is associated, said virtual space (1) and the pictograms (2, 3 ... N) appearing therein being designed to be displayed on the screens available to the users, the size of the virtual space (1) varying according to the number of pictograms (2, 3 ... N) appearing in said virtual space (1). Graphical user interfaces.

18 Claims, 6 Drawing Sheets

(51) Int. Cl.
    *G06F 3/0481*     (2013.01)
    *G06F 3/0486*     (2013.01)
    *H04W 4/21*     (2018.01)

(56) References Cited

U.S. PATENT DOCUMENTS

| | | | |
|---|---|---|---|
| 6,330,022 B1 * | 12/2001 | Seligmann | H04N 7/147 348/14.08 |
| 6,625,595 B1 * | 9/2003 | Anderson | G06F 17/3061 |
| 6,772,195 B1 * | 8/2004 | Hatlelid | G06F 3/04815 345/419 |
| 8,473,532 B1 * | 6/2013 | Ben | G06F 17/30091 707/694 |
| 2006/0063539 A1 | 3/2006 | Beyer, Jr. | |
| 2008/0234844 A1 * | 9/2008 | Boustead | H04S 3/002 700/94 |
| 2009/0144638 A1 * | 6/2009 | Haggar | G06N 3/006 715/757 |
| 2011/0055721 A1 * | 3/2011 | Jain | G06Q 30/02 715/748 |
| 2011/0177863 A1 * | 7/2011 | Davidson | G06Q 90/00 463/29 |
| 2012/0026177 A1 * | 2/2012 | Johlic | G09G 5/00 345/522 |
| 2012/0131483 A1 * | 5/2012 | Archer | G06F 17/30899 715/766 |
| 2012/0150970 A1 | 6/2012 | Peterson et al. | |
| 2014/0331149 A1 * | 11/2014 | Labey | H04L 67/14 715/757 |

\* cited by examiner

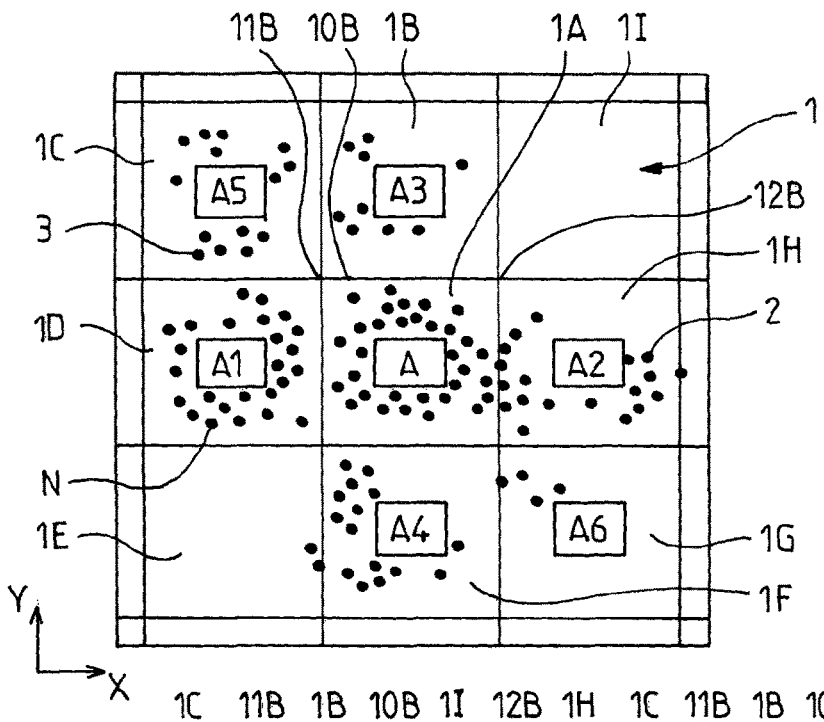

GRAPHICAL USER INTERFACE FOR SIMULTANEOUS USE BY REMOTE USERS EACH HAVING CORRESPONDING PICTOGRAMS IN A VIRTUAL SPACE OF THE GRAPHICAL USER INTERFACE, METHOD, COMPUTER PROGRAM AND CORRESPONDING STORAGE MEDIUM

TECHNICAL FIELD

The present invention relates to the general technical field of the graphical user interfaces that makes it possible, for example, for a plurality of users located remotely from one another to communicate with one another in real time or even to use applications collectively or individually, in particular by means of networked terminals.

The present invention relates more particularly to a graphical user interface which can be used simultaneously by remote users each having at least one display screen.

The invention also relates to a method for administering a graphical user interface which can be used simultaneously by remote users each having at least one display screen.

The invention also relates to a computer program comprising a computer program code means suitable for executing the steps of a method for administering a graphical user interface which can be used simultaneously by remote users each having at least one display screen.

Finally, the invention relates as such to a medium which can be read by computer and on which is stored a computer program comprising a computer program code means suitable for executing the steps of a method for administering a graphical user interface which can be used simultaneously by remote users each having at least one display screen.

PRIOR ART

There are already various graphical user interfaces which can be used simultaneously by remote users having terminals, for example of the kind of personal computers, smartphones, touch tablets, etc., linked to the Internet network.

There are, for example, chat programs which enable users to dialogue online by inputting the text of their contributions using the keyboard of their terminal. These chat programs, well known as such, also often offer an audio-video dialogue function enabling the participants of a discussion to see and hear their correspondents, the image and sound of which are picked up by the webcam and the microphone with which their computers are equipped.

These chat programs, although overall they give satisfaction, nonetheless present certain drawbacks.

Firstly, the user interface provided by these programs may appear confused, with unsatisfactory legibility, particularly in group discussions. Furthermore, the known chat programs do not make it possible to initiate a discussion easily and in an impromptu manner, particularly with unknown parties. Finally, these programs rely on a technology which requires the installation on each client station of a program, which is a source of complications. The known chat programs do not therefore constitute fully satisfactory user interfaces, particularly when it comes to easily organising group discussions.

There are, moreover, videoconferencing programs which enable remote users to set up an audiovisual connection, via their respective computers, with one or more correspondents. These known videoconferencing programs are, however, generally relatively complex to learn, relatively expensive to use (the group videoconference generally being a payable service) and do not make it possible to initiate an audio-video discussion simply and in an impromptu manner, particularly with a hitherto unknown party.

The currently known chat and videoconferencing programs ultimately prove to be non-ergonomic and non-intuitive, and do not in particular facilitate unscheduled contacts with new people.

Social networks deployed on the Internet are also known. These social networks do not however make it possible to simply and easily carry out group discussions, or to initiate, in an improvised manner, a chat with a member of the network who has not previously been duly registered in a list of contacts or "friends".

Nor do these social network interfaces allow for the simple organisation of videoconferences, or the simple and intuitive organisation of virtual events where the number of participants is not necessarily known in advance and may change significantly over time.

Finally, three-dimensional virtual universes are also known, coming both under gaming and social networking, and which enable users connected to the Internet network to browse in a realistic virtual environment via an avatar as the incarnation of the user concerned. The programs that implement such virtual worlds notably enable the users to dialogue with one another according to conventional "chat" ergonomics (dialogues typed on the keyboard) via their avatars. These three-dimensional virtual worlds are relatively seductive because they offer a very realistic environment. However, they generally take a long time to learn (often greater than three hours) which reserves them for an informed public. These programs also do not allow for the sharing of contents (files and other) and their use is more like that of a networked game than of a simple and intuitive graphical user interface.

All the user interfaces discussed above are also generally designed for a predetermined spatial density of participants, which may cause visual confusion when there are too many participants, or conversely a sensation of emptiness when there are few users, such over-densities or under-densities possibly being perceived negatively by the users and being detrimental to the ergonomics of the user interface.

The objects assigned to the invention consequently aim to remedy the various drawbacks listed previously and to propose a novel graphical user interface which is highly ergonomic and intuitive, and which, on the one hand, remains extremely legible and easy to use even when the number of simultaneous users is high and, on the other hand, reduces the sensation of solitude which could affect the users when the number thereof simultaneously using the interface is low.

Another object of the invention aims to propose a novel graphical user interface which is extremely easy to control with no particular skill or hardware.

Another object of the invention aims to propose a novel graphical user interface whose legibility and ergonomics remain substantially constant, regardless of the number of simultaneous users.

Another object of the invention aims to propose a novel graphical user interface which makes it possible to very simply and intuitively organise collective and/or collaborative virtual events.

Another object of the invention aims to propose a novel graphical user interface which enables users to simultaneously access, very simply and intuitively, an audiovisual or application content, and to do so regardless of the number of users and the variation over time of said number.

Another object of the invention aims to propose a novel graphical user interface which is very user-friendly and uses little memory and computation power.

Another object of the invention aims to propose a novel method for administering a graphical user interface which makes it possible to maintain the legibility and the user-friendliness of a user interface regardless of the number of users thereof.

Another object of the invention aims to propose a novel computer program and a novel medium that can be read by a computer and on which is stored a computer program, which makes it possible to obtain the various advantages listed above.

EXPLANATION OF THE INVENTION

The objects assigned to the invention are achieved using a graphical user interface which can be used simultaneously by remote users each having at least one display screen, said graphical user interface comprising a virtual space as well as a plurality of pictograms respectively associated with each of said users, each pictogram being designed to appear in said virtual space and disappear therefrom under the control of the user with whom it is associated, said virtual space and the pictograms appearing therein being designed to be displayed on the screens available to the users, the size of the virtual space varying according to the number of pictograms appearing in said virtual space.

The objects assigned to the invention are also achieved using a method for administering a graphical user interface which can be used simultaneously by remote users each having at least one display screen, said graphical interface comprising a virtual space as well as a plurality of pictograms respectively associated with each of said users, each pictogram being designed to appear in said virtual space and disappear therefrom under the control of the user with whom it is associated, said virtual space and the pictograms appearing therein being designed to be displayed on the screens available to the users, said method comprising a step for adjusting the size of the virtual space in which said size is varied according to the number of pictograms appearing in said virtual space.

The objects assigned to the invention are also achieved using a computer program comprising a computer program code means suitable for executing the steps of the method targeted above.

The objects assigned to the invention are also achieved using a medium that can be read by a computer and on which is stored a program in accordance with the above.

BRIEF DESCRIPTION OF THE DRAWINGS

Other objects and advantages of the invention will appear in more detail on reading the following description, with reference to the appended drawings, given in a purely administrative and nonlimiting manner, in which:

FIG. 5 illustrates the graphical user interface of the preceding figures, except that the graphical object A is copied five times, so as to allow all the users to bring their associated pictograms close to the graphical object A or one of its copies A1, A2, A3, A4, A5, A6, in order to access the associated functionalities, functionalities which are advantageously accessible when the pictogram of the user concerned is sufficiently close to the graphical object A or one of its copies.

FIGS. 6 to 9 illustrate an exemplary algorithm for duplicating a graphical object A within a graphical user interface in accordance with the invention; in FIG. 6, the graphical object A is not duplicated, whereas in FIG. 7 it is duplicated in four copies A1-A4: in FIG. 8, four new copies A5-A8 are added, as in FIG. 9 where the copies A9-A12 of the graphical object A appear at the same time and as the size of the virtual space increases.

FIG. 16 also illustrates the appearance of a new graphical object D.

Figure 1:
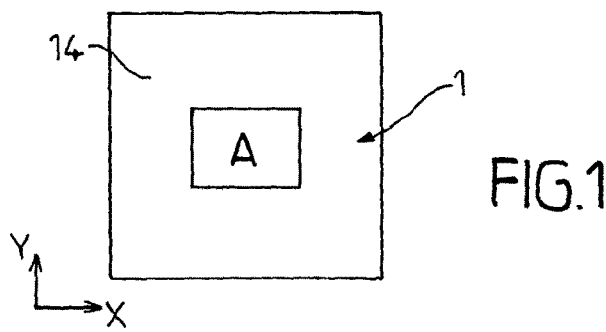
FIG. 1 schematically illustrates a virtual space and a graphical object A positioned in this virtual space, said virtual space and graphical object A forming part of a graphical user interface in accordance with the invention.

PREFERRED EMBODIMENT OF
IMPLEMENTING THE INVENTION

The invention relates, according to a first aspect, to a graphical user interface which can be used simultaneously by remote users each having at least one display screen. The screen concerned may, for example, be a personal computer monitor, a graphics tablet, a telephone screen (for example of "smartphone" type), or even a television screen. Preferably, each of the screens of said users serves as a display peripheral device and is functionally linked to a central processing unit including, for example, at least one processor and memories (RAM, ROM, etc.). The screen of each user may be either an output peripheral device, which provides only a display function (case of a conventional computer monitor or of a television screen), or an input/ output peripheral device (in the case where the screen concerned is a touch screen implemented, for example, on a graphics tablet or a "smartphone"). In the case where the screen is only an output peripheral device, the user concerned also preferentially has input peripheral devices (for example: keyboard, mouse, trackball, etc.). Each screen preferably allows a colour display and advantageously constitutes the peripheral device of a central processing unit (whether it is a central processing unit of a computer, of a graphics tablet, of a "smartphone" or other) connected to a telecommunications network, which is preferably the Internet network. The screen of each user advantageously forms part of the user interface according to the invention.

The term "graphical user interface" is generally used to designate a dialogue means between the user of an automated processing device such as a computer (in the broad sense of the term) provided with a screen, said dialogue means being based on the use of graphical objects, displayed on said screen and enabling the user to interact with said automated processing device (to use software applications for example) and/or to communicate with other users simultaneously using the same graphical user interface, in which case the latter forms a communication interface between each of the users concerned.

The graphical user interface according to the invention comprises, as illustrated in the figures, a virtual space 1 which is designed to be displayed, preferably simultaneously, on each of the display screens available to the users. Preferably, in order to render the interface particularly simple and legible, the virtual space 1 is two-dimensional, and thus advantageously takes the form of a surface extending in only two directions in space (horizontal direction X and vertical direction Y) so as to be included in one and the same plane which is advantageously the display plane of the screen of each user (corresponding to the plane of the plate in the appended figures). In the description which follows, for reasons of simplicity and conciseness, reference will be made only to a two-dimensional virtual space 1, it being understood that it is perfectly possible to envisage said virtual space 1 being three-dimensional, or even one-dimensional.

The graphical user interface in accordance with the invention also comprises a plurality of pictograms 2, 3 . . . N respectively associated with each of said users. Each pictogram 2, 3 . . . N is designed to appear in the virtual space 1 and disappear therefrom under the control of the user with whom it is associated. The user can therefore control the visual appearance and the disappearance of his or her respective pictogram 2, 3 . . . N, this control being performed using any known means (for example: mouse, touch screen, keyboard, etc.), which advantageously forms part of the graphical user interface.

The virtual space 1 and the pictograms 2, 3 . . . N appearing therein are designed to be displayed on the screens available to the users, so that each of the users can view, on his or her screen at the same time, the virtual space 1 and the pictograms 2, 3 . . . N present within the latter.

Advantageously, each of said pictograms 2, 3 . . . N constitutes a graphical avatar representing the user with whom it is associated, that is to say, constitutes a virtual object which is the visual incarnation of the associated user in the virtual space 1.

The virtual space 1 thus advantageously constitutes a screen background or backdrop, in which the graphical avatars 2, 3 . . . N move. The invention is not, however, limited to pictograms forming graphical avatars of the users. Alternatively, the pictograms 2, 3 . . . N may, for example, be mobile work spaces associated with each user.

Preferably, each pictogram 2, 3 . . . N is two-dimensional, and has, for example, a disc form, as illustrated in the figures. In other words, each pictogram 2, 3 . . . N advantageously extends exclusively in one and the same plane common to all the pictograms 2, 3 . . . N, said plane being parallel to the plane in which the virtual space 1 extends.

In the appended figures, the plane concerned corresponds to the plane of the drawing plates. Thus, the pictograms 2, 3 . . . N are superposed on the virtual space 1, in a plane parallel to the plane of extension of the virtual space 1, when the latter is two-dimensional. This use of a virtual space 1 and of pictograms 2, 3 . . . N, all of which are two-dimensional, is preferred, because it gives the user interface simplicity of use and excellent ergonomics. It is, however, quite possible to envisage having graphical avatars 2, 3 . . . N which are not all two-dimensional, but rather three-dimensional (which, moreover, does not preclude them from moving on a two-dimensional virtual space 1). The invention therefore covers any type of visual rendering (2D, 2.5D, 3D, isometric 3D, etc.).

Advantageously, the appearance of a given pictogram 2, 3 . . . N in the virtual space 1 corresponds to an actual use of the graphical user interface by the user with whom the pictogram concerned is associated. In other words, the appearance of a given pictogram corresponds to the login of a user to the graphical user interface, the login being obtained by any appropriate known means (for example by inputting a password on the keyboard). Conversely, the disappearance of a pictogram 2, 3 . . . N from the virtual space 1 corresponds to a logout of the corresponding user from the graphical user interface, the logout being obtained once again by any means that is available and known in the computing field.

Advantageously, each pictogram 2, 3 . . . N appearing in said virtual space 1 is designed to be able to be moved within said virtual space 1 by the user with whom it is associated. To this end, the graphical user interface advantageously comprises control means enabling each user to control the movement of his or her respective pictogram 2, 3 . . . N. In other words, each participant has control means enabling him or her to move on the screen, in a controlled and preferably real-time manner, his or her own associated pictogram 2, 3 . . . N. The control means concerned may, for example, be formed by an input peripheral device such as a mouse or a touch screen (in the latter case, the touch screen therefore acts both as screen and as control means within the meaning of the invention).

By virtue of the control means concerned, each user can vary the position of his or her pictogram 2, 3 . . . N in the virtual space 1, in order, for example, to approach or move away from another pictogram or group of pictograms.

In this case, the user interface according to the invention advantageously constitutes a direct manipulation interface, in other words, an interface which enables, in particular, its users to directly "manipulate" (via a mouse or a touch screen for example) graphical elements (in this case, their respective pictograms 2, 3 . . . N) in the same way as they would with physical objects in the real world. The benefit of using such a direct manipulation interface lies notably in the intuitive nature of such an interface, which enables each user of the interface to view in real time the result of his or her procedures, and, for example, the result of a command to move his or her pictogram 2, 3 . . . N. Advantageously, the graphical user interface is designed for each pictogram 2, 3 . . . N to be able to be moved by drag-and-drop. Preferably, the control means are therefore designed to enable each user to control the movements of his or her corresponding pictogram 2, 3 . . . N by drag-and-drop. Each user can thus point to his or her pictogram 2, 3 . . . N which is displayed on the screen (either directly using his or her finger in the case of a touch screen, or using a mouse pointer for example), to then drag his or her pictogram to a chosen new position, a position in which the user will drop the pictogram 2, 3 . . . N concerned (by removing his or her finger from the screen in the case of a touch screen or by ceasing to press the left mouse button for example).

As illustrated in the figures, the size of the virtual space 1 varies as a function of the number of pictograms 2, 3 . . . N appearing in said virtual space 1. In other words, the dimensions of the virtual space 1 are open-ended, and depend on the number of pictograms 2, 3 . . . N present in said virtual space 1. By virtue of this characteristic, the graphical user interface is capable of retaining its general appearance, and therefore its user-friendliness and its ergonomics, independently of the number of users logged in to the graphical user interface.

Thus, there is no longer any sensation of emptiness when there are few users logged in, so that there are also few pictograms 2, 3 . . . N appearing in the virtual space 1. Conversely this technical measure makes it possible to avoid an over-density of pictograms 2, 3 . . . N in the virtual space 1 which would be detrimental to the practicality of use of the graphical user interface.

The variation of the size of the virtual space 1 as a function of the number of pictograms 2, 3 . . . N appearing in the virtual space 1 therefore advantageously makes it possible to keep the density of pictograms 2, 3 . . . N appearing in the virtual space 1 substantially constant. Thus, in the case where the virtual space 1 is two-dimensional, the variation of the size of the virtual space 1 corresponds to a variation of the area of said virtual space 1, this variation of the area of the virtual space 1 as a function of the number of pictograms 2, 3 . . . N appearing in said virtual space 1 making it possible in particular to keep the density of pictograms 2, 3 . . . N in the virtual space 1, that is to say the number of pictograms 2, 3 . . . N appearing per unit of surface area, substantially constant.

Preferably, the graphical user interface according to the invention is advantageously designed for the size of the virtual space 1 to vary as a function of the number of pictograms 2, 3 . . . N appearing in said virtual space 1, so that the surface density of the pictograms 2, 3 . . . N remains substantially constant, or at least remains within the same order of magnitude.

Advantageously, the size of the virtual space 1 varies progressively according to the number of pictograms 2, 3 . . . N appearing in said virtual space 1. This progressive variation makes it possible to permanently adapt, in real time, the size of the virtual space 1 to the instantaneous number of pictograms 2, 3 . . . N appearing in the virtual space 1, so as to advantageously keep the ratio between the number of pictograms 2, 3 . . . N appearing in the virtual space 1 and the size thereof substantially constant. In other words, the graphical user interface is advantageously designed to ensure an automatic regulation of the abovementioned ratio (which corresponds to the surface density of the pictograms in the case of a two-dimensional virtual space). The size of the virtual space 1 is therefore advantageously slaved to the number of pictograms 2, 3 . . . N.

Figure 2:
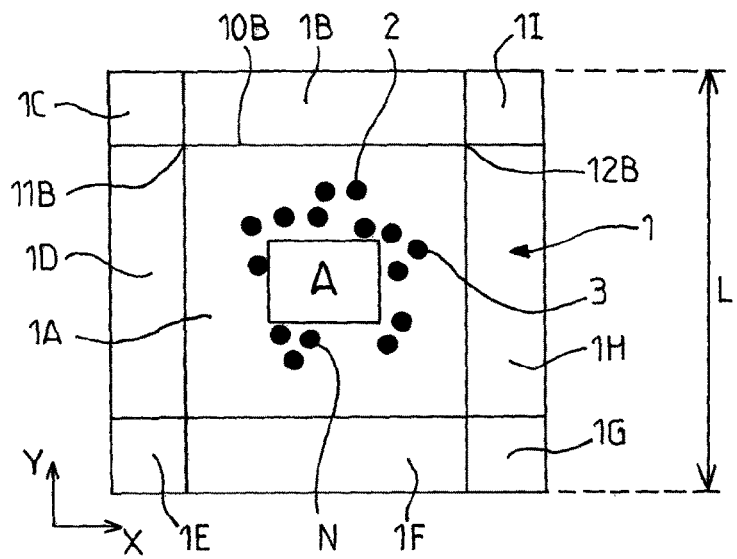
FIG. 2 illustrates the same graphical interface as that illustrated in FIG. 1, except that a plurality of pictograms appears in the virtual space, each being associated with a corresponding user, the size of the virtual space being enlarged relative to the size that it had in FIG. 1 because of the presence of said pictograms.

Advantageously, the size of the virtual space 1 increases, preferably progressively, when the number of pictograms 2, 3 . . . N appearing in said virtual space 1 also increases, the virtual space 1 thus becoming increasingly large as the number of pictograms 2, 3 . . . N present within it increases. This property is, for example, illustrated by FIGS. 1 and 2:

in FIG. 1, no pictogram appears in the virtual space 1, which takes the form of a square;

FIG. 2 represents the same virtual space 1, this time with a number of pictograms 2, 3 . . . N appearing in it (in this case, fifteen); the progressive appearance of these pictograms within the virtual space 1 causes the latter to increase in size, taking the form of a square of larger dimension.

Advantageously, and as illustrated in the figures, the virtual space 1 is formed by at least one first individual polygonal tile 1A, the size of the virtual space 1 being designed to increase by the generation of at least one second individual polygonal tile 1B-1Z adjacent to said first individual polygonal tile 1A. The second individual polygonal tile 1B is preferably generated progressively according to the number of pictograms 2, 3 . . . N appearing in the first individual polygonal tile 1A.

In this preferred case, illustrated in the figures, the size of the virtual space 1 is made to increase by the generation of a mosaic formed by a number of adjacent polygonal tiles forming a continuous surface. In the example illustrated in the figures, the edges of each tile 1A-1Z are visible for the purposes of the description, but it is generally preferable for these edges not to be visible, so that the users do not perceive that the virtual space 1 results from the assembly of a number of tiles.

Advantageously, said individual polygonal tiles are substantially rectangular, and even more preferably, are substantially square, as illustrated in the figures.

Advantageously, the second individual polygonal tile 1B has at least one side 10B and/or one vertex 11B, 12B in common with said first individual polygonal tile 1A. Thus, in this preferred embodiment, the space is made to increase in size, as illustrated in the figures, by development (preferably progressive development) of a mosaic consisting of mutually adjoining tiles.

Preferably, each individual polygonal tile 1A-1Z has a square form as in the examples illustrated in the figures. In this preferred embodiment, the virtual space 1 is made to increase in size preferably by generation, around the first individual polygonal tile 1A, of eight adjacent tiles 1B-1I, four of which (1B, 1D, 1F, 1H) have both one side and two vertices in common with the first individual tile 1A, and four others of which (1C, 1E, 1G, 1I) have a vertex in common with the first individual tile 1A.

As emerges from FIG. 2, the virtual space 1 is advantageously made to increase in size by progressive and simultaneous generation of all the abovementioned adjacent tiles 1B-1I, so that the virtual space 1 increases homothetically, and, in the case in point, permanently retains its square form.

Figures 3, 4:
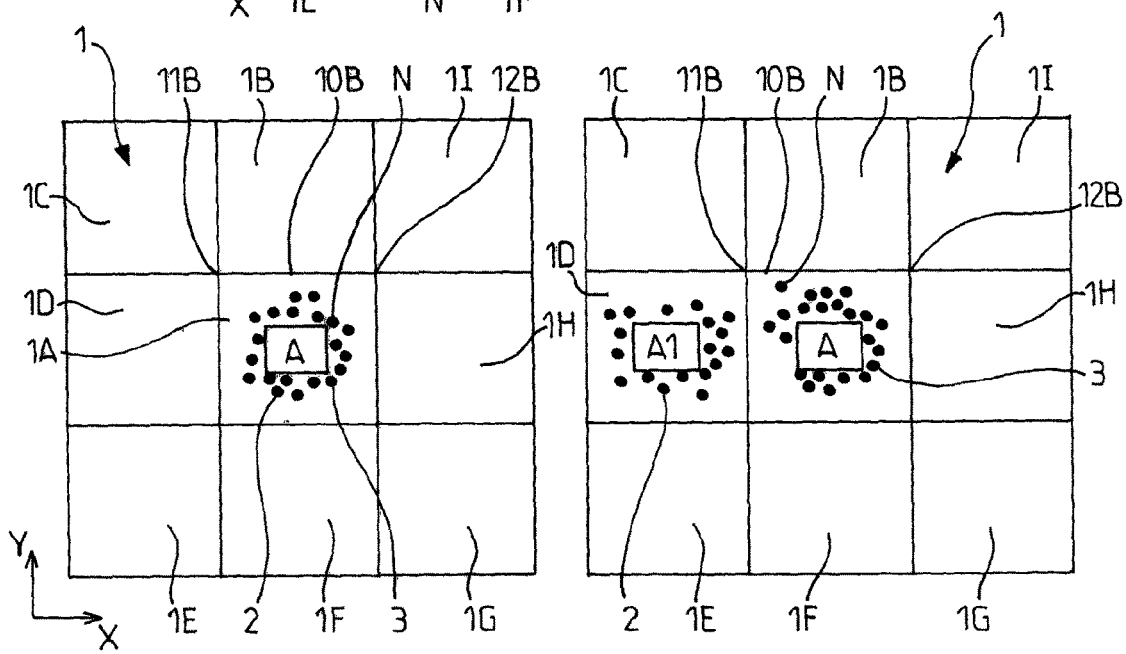
FIG. 3 illustrates the same graphical user interface as that illustrated in FIG. 2, except that the virtual space is further enlarged to take account of the increase in the number of pictograms appearing in the virtual space, around the graphical object A.
FIG. 4 illustrates the graphical user interface of the preceding figures, in which the graphical object A has been copied in the form of an additional graphical object A1, in order to allow additional pictograms, which can no longer be near the graphical object A because of the density of the pictograms already present around the graphical object A, to approach the copy A1 of the graphical object A, the copy A1 having the same functionalities as those of the original graphical object A.

FIGS. 1 to 3 illustrate an example of this homothetic increase. In FIG. 1, the virtual space 1 is formed by a single tile, namely the first individual polygonal tile 1A. The size of the virtual space 1 therefore advantageously has a minimum value, said virtual space 1 being formed, when it has its size of minimum value, by the first individual tile 1A, called initial tile. The size of the virtual space 1 is designed to increase by generation of one or more additional tiles, preferably identical to the initial tile and which have, with the latter, at least one side and/or one vertex in common.

FIGS. 1 to 3 illustrate an example of the progressive increase in the size of the virtual space 1. In FIG. 1, the virtual space 1 has its minimum size and as such is formed by an initial tile 1A of square form.

In FIG. 2, the influx of pictograms 2, 3 ... N results in a progressive increase in the size of the virtual space 1 from the initial tile 1A, by simultaneous and progressive generation of eight additional tiles 1B-1I which progressively appear from the initial tile 1A, that is to say from the sides and vertices thereof.

FIG. 2 illustrates an intermediate step in the formation of the eight tiles 1B-1I whereas in FIG. 3, the eight tiles concerned 1B-1I are completely formed, so that the virtual space 1 has, in this case, progressively multiplied its size by 9.

Advantageously, the graphical user interface comprises at least one graphical object A positioned in the virtual space 1, so as to be displayed concomitantly with the virtual space 1 and the pictograms 2, 3 ... N on the screens of the users.

Advantageously, the graphical user interface is designed to trigger, for the attention of each user whose associated pictogram 2, 3 ... N is separated from said graphical object A by a distance less than or equal to a predetermined value (threshold value), an action affecting each of said users. Said graphical object A thus makes it possible to trigger a process affecting a given user according to the distance separating the pictogram associated with this user from the graphical object A. This action affecting the users for whom the associated pictogram 2, 3 ... N is separated from the graphical object A by a distance less than or equal to a predetermined value comprises, for example, one or more of the elements in the following list:

broadcasting (for example live), for the attention of said users, of an audiovisual or sound programme;

access to a computer game enabling said users to play together, preferably in real time;

setting up of a chat channel enabling said users to chat with one another, preferably in real time;

setting up of a communication channel enabling said users to exchange data files with one another;

setting up of a communication channel enabling said users to set up collaborative document publishing;

activation of an application enabling an exchange or an interaction or a collaboration, in real time or not and synchronised or not, between a number of users (two or more);

access to a purchase/sales service.

This list is obviously absolutely not exhaustive.

Generally, the graphical object A is advantageously formed by an icon associated with a computer application able to provide a function or a service to a user. The latter launches said application by bringing his or her pictogram close enough to the icon concerned, so that the distance between said pictogram and the graphical object A is less than or equal to the abovementioned predetermined value.

In the context of the first example cited previously (broadcasting of an audiovisual or sound programme), the positioning, by a user, of his or her associated pictogram 2, 3 ... N at a distance from the graphical object A less than or equal to said predetermined value generates the transformation of the graphical object A into a viewing window broadcasting, for example, an audiovisual programme, said programme being visible to the user on his or her screen. The users for whom the associated pictogram is at a distance from the graphical object A by a value greater than the predetermined value would not see this viewing window on their respective screens, but only an icon (not active) forming the graphical object A. It is, however, perfectly possible to envisage, according to an alternative embodiment, having the viewing window permanently visible to all the users, independently of the distance separating their pictograms 2, 3 ... N from the graphical object A.

In the abovementioned second example, the users for whom the pictogram is sufficiently close to the graphical object A activate a game window which displays, for example, the elements of a game controlled by the user or users concerned.

Finally, in the last example mentioned previously, the graphical user interface is advantageously designed to automatically set up a chat channel between at least two users when the distance between, on the one hand, the graphical object A and, on the other hand, each of the pictograms associated with the users concerned is less than or equal to the abovementioned predetermined value. In this case, the graphical user interface advantageously forms a communication interface between the users concerned. The setting up of these chat channels enables the users to chat with one another, by any known means (chat, videoconferencing, etc.). Generally, the expression "chat channel" here designates any system linking mutually distant users to enable them to dialogue in real time, whether by the exchange of text messages, by telephony or by videoconferencing. The chat channel is therefore advantageously a conversation channel which allows for a remote exchange between at least two users logged in to the user interface according to the invention.

Obviously, the examples explained above are purely illustrative and nonlimiting, and many other possibilities can be envisaged on the basis of the general concept of the invention, it being understood that it is most particularly preferable to use a virtual space 1 containing, on the one hand, pictograms associated with users and, on the other hand, graphical objects associated with applications that can be activated by the users according to the position of their respective pictograms in relation to said graphical objects.

This extremely simple, reliable and ergonomical interface concept makes it possible in particular to organise, in a virtual manner, events with a large audience, live. For example, the graphical object A may constitute the point of connection to a screen for broadcasting a concert live, which users virtually attend, via their screen, by moving their associated pictogram close to the graphical object A, it being understood that the size of the virtual space 1 increases with the influx of pictograms to keep the interface clear and user-friendly, and thus allow each user not to see his pictogram embedded in a dense crowd of other pictograms.

In order to further optimise the legibility and the practicality of the graphical user interface according to the invention, the size of the virtual space 1 varies advantageously also according to the number of pictograms 2, 3 ... N which are separated from the graphical object A by a distance less than or equal to said predetermined value.

Thus, in a particularly advantageous manner, it is not only the number of pictograms 2, 3 ... N appearing in the virtual space 1 which acts on the size thereof, but also the number of pictograms 2, 3 ... N which are located within a predetermined perimeter around the graphical object A.

Preferentially, and as illustrated in the figures, the graphical user interface is designed to generate a copy of said graphical object A when the number of pictograms 2, 3 ... N which are separated from said graphical object A by a distance less than or equal to said predetermined value exceeds a threshold value, said copy A2, A3, A4, A5, A6, A7, A8, A9, A12 being positioned at a distance from said graphical object A.

For example, as illustrated in the figures, the graphical object A is positioned substantially at the centre of the initial tile 1A, whereas each copy A2-A12 of the graphical object A is respectively positioned at the centre of one of the adjacent tiles, as illustrated in the figures. This duplication of the graphical object A makes it possible to create, if the virtual influx of users makes it necessary, a multiplication of the graphical object A (the copies A2-A12 in fact advantageously having the same properties as the graphical object A), so as to spatially distribute the number of users in the virtual space 1, while allowing said users to be able to potentially benefit from the same service and the same functionalities.

To this end, the graphical user interface is advantageously designed to trigger, for the attention of each user for whom the associated pictogram 2, 3 . . . N is separated from said graphical object A by a distance less than or equal to said predetermined value, an action affecting each of said users, but within the limit of a predetermined maximum number of users. Thus, when this maximum number is reached, that is to say the number of pictograms 2, 3 . . . N separated from the graphical object A (or from one of its copies A2-A12) is equal to said predetermined maximum number, a new user, wanting to trigger said action by moving his or her pictogram closer to the graphical object A, could not trigger the action concerned even by moving his or her pictogram sufficiently close to the graphical object A (for the distance between the graphical object A and the pictogram concerned to be less than or equal to the predetermined value). A message could possibly be automatically generated at that instant for the attention of the user concerned, indicating to him or her that the maximum capacity for the graphical object A concerned has been reached and that he or she should move his or her pictogram to a copy A1-A12 of the graphical object A around which the maximum number of users has not yet been reached.

It is, however, perfectly possible to envisage, alternatively, having the user interface not in any way manage the number of users present, via their respective pictograms, around the graphical object A, this number therefore not being limited to a maximum number. In this preferred case, the user interface allows the users total freedom to position their pictograms, and manages only the overall density of users, not the local density around the graphical object A. The invention therefore relies, in its most advantageous form, on a dual mechanism, namely:

an adjustment of the overall size of the virtual space 1 as a function of the number of pictograms 2, 3 . . . N actually present in said virtual space 1;

and a multiplication of the graphical object A in order to distribute the pictograms and avoid having them concentrate around one and the same graphical object, which could render the user interface illegible and unusable.

Obviously, various algorithms for multiplying the graphical object A can be envisaged. For example, as illustrated in FIGS. 6 to 9, the multiplication of the graphical object A and the positioning of the copies thereof can be performed as follows:

The first four copies A1, A2, A3, A4 of the graphical object A are respectively arranged to the left, to the right, above and below the graphical object A, in the tiles 1B, 1D, 1F, 1H adjacent to the tile 1A including the graphical object A and which share with said initial tile 1A at least one common side.

Then, the additional copies A5, A6, A7, A8 are arranged in the remaining empty tiles, so that the graphical object A and its copies form a square pattern (FIG. 8).

From this square pattern illustrated in FIG. 8, additional copies A9, A10, A11, A12 respectively appear to the left, to the right, above and below (as in FIG. 7). The configuration illustrated in FIG. 9 is thus obtained.

The process continues by filling up the empty tiles then by making four additional copies appear once again arranged in a cross (that is to say, to the left, to the right, above and below), and so on.

Obviously, the invention is absolutely not limited to a specific algorithm for managing the appearance and the positioning of the copies of the graphical object A.

Figure 14:
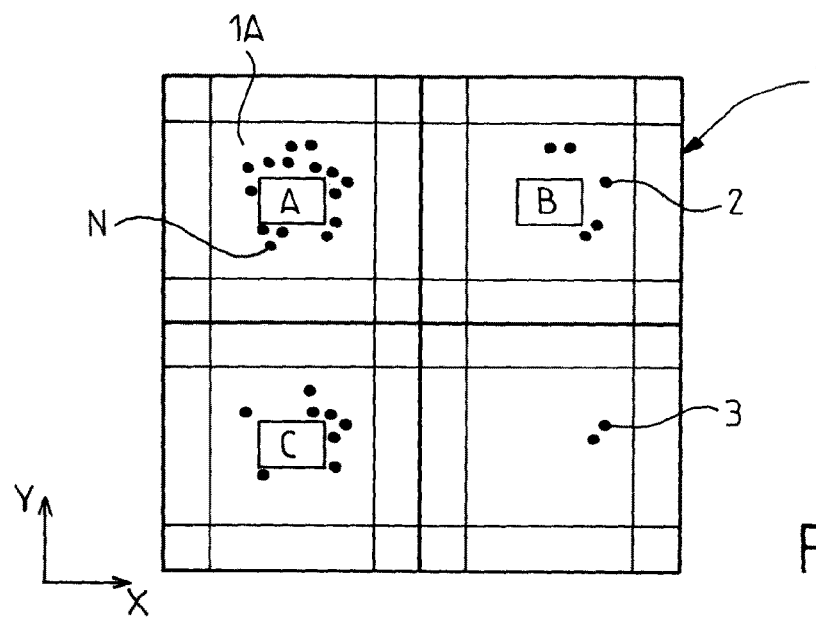
FIGS. 14 to 16 illustrate a user interface according to the invention for which the virtual space includes a number of different graphical objects A, B, C, the influx of pictograms resulting in the increasing of the size of the virtual space of said interface (FIG. 15), and the multiplication of each of said graphical objects A, B, C as a function of the abundance of pictograms around said objects.
Figure 15:
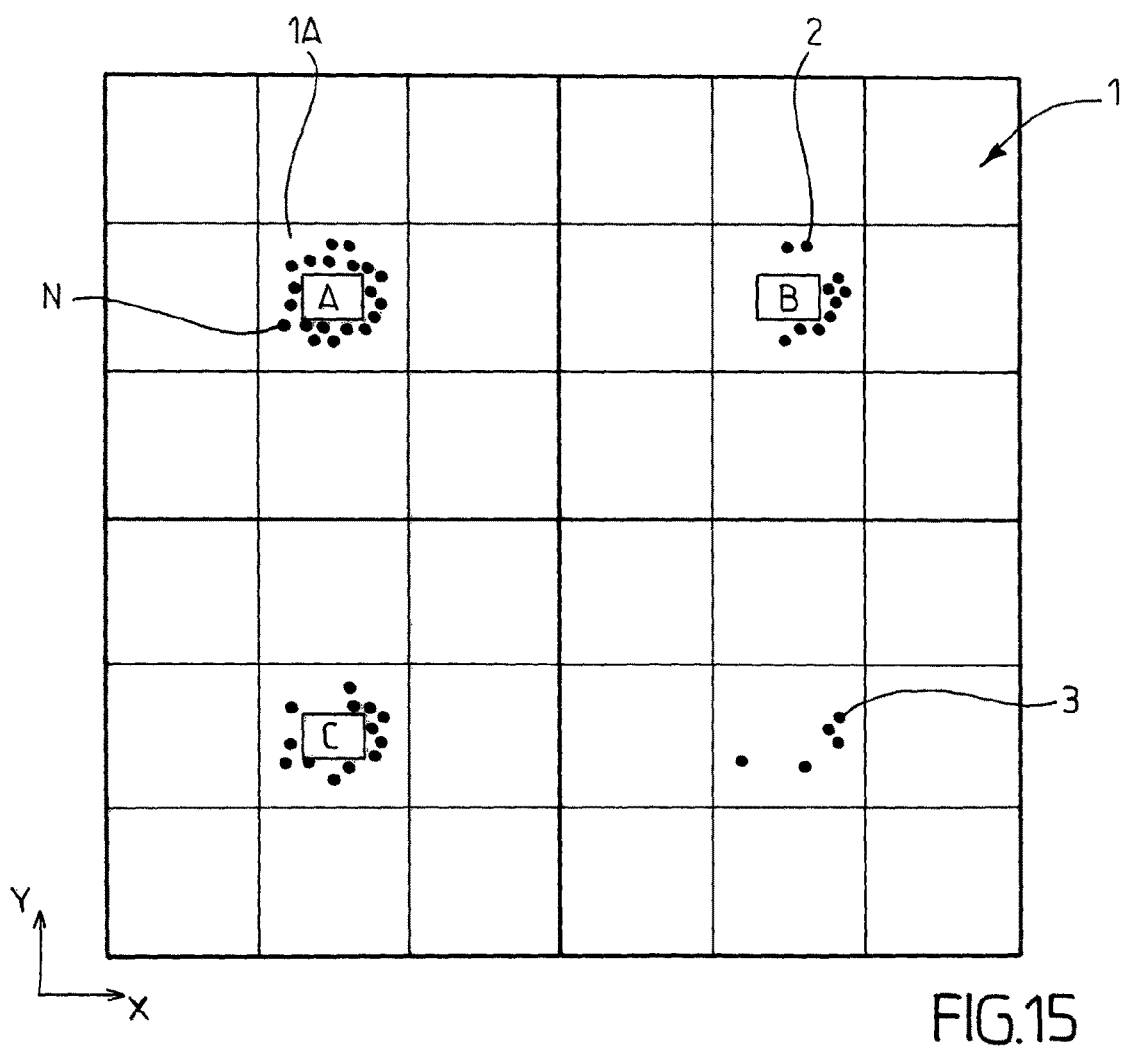
Figure 16:
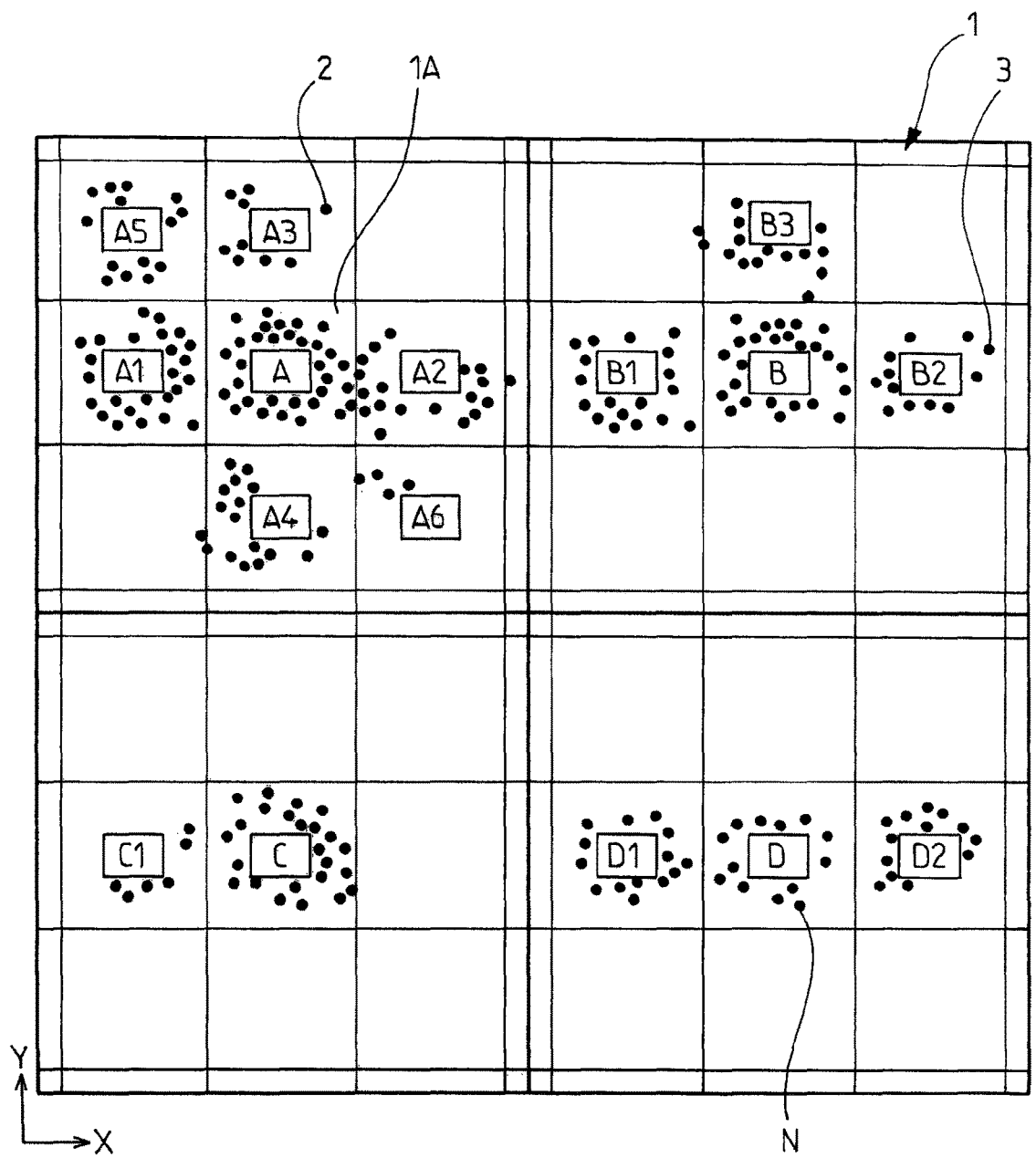

Furthermore, the various principles explained hereinabove in relation to a single graphical object A (and its duplicates A2-A12) are also valid when a number of distinct graphical objects are implemented. For example, as illustrated in FIGS. 14 to 16, three distinct graphical objects A, B, C can coexist in one and the same virtual space 1, each of said graphical objects A, B, C corresponding, for example, to a specific (software) application (the graphical object A corresponding, for example, to the repeat broadcasting of a live concert, the graphical object B corresponding to an online multiple-player game, whereas the graphical object C corresponds to a meeting point for users wanting to dialogue as a group). As illustrated in FIG. 15, the influx of users for each application A, B, C, corresponding to an influx of pictograms 2, 3 . . . N, causes the virtual space 1 around each graphical object A, B, C to be enlarged. An additional influx of users, embodied by an appearance of additional pictograms, generates, as illustrated in FIG. 16, a proportional multiplication of each graphical object (the graphical object A is thus multiplied six times, whereas the graphical object B is multiplied three times and the graphical object C is duplicated in just a single copy). An additional graphical object D can also be added (for example by the administrator of the user interface, which is advantageously available from a website) and also be multiplied according to the number of interested users who move their associated pictograms close to the graphical object 1D to launch the corresponding action.

Advantageously, in the same way as the size of the virtual space 1 increases when the number of pictograms 2, 3 . . . N appearing in said virtual space 1 increases, the size of the virtual space 1 decreases when the number of pictograms 2, 3 . . . N appearing in said virtual space 1 decreases. This makes it possible to adapt the size of the virtual space 1 in the event of user logouts from the graphical user interface, logouts which result in the disappearance of the pictograms respectively associated with said users who leave the interface.

Figure 10:
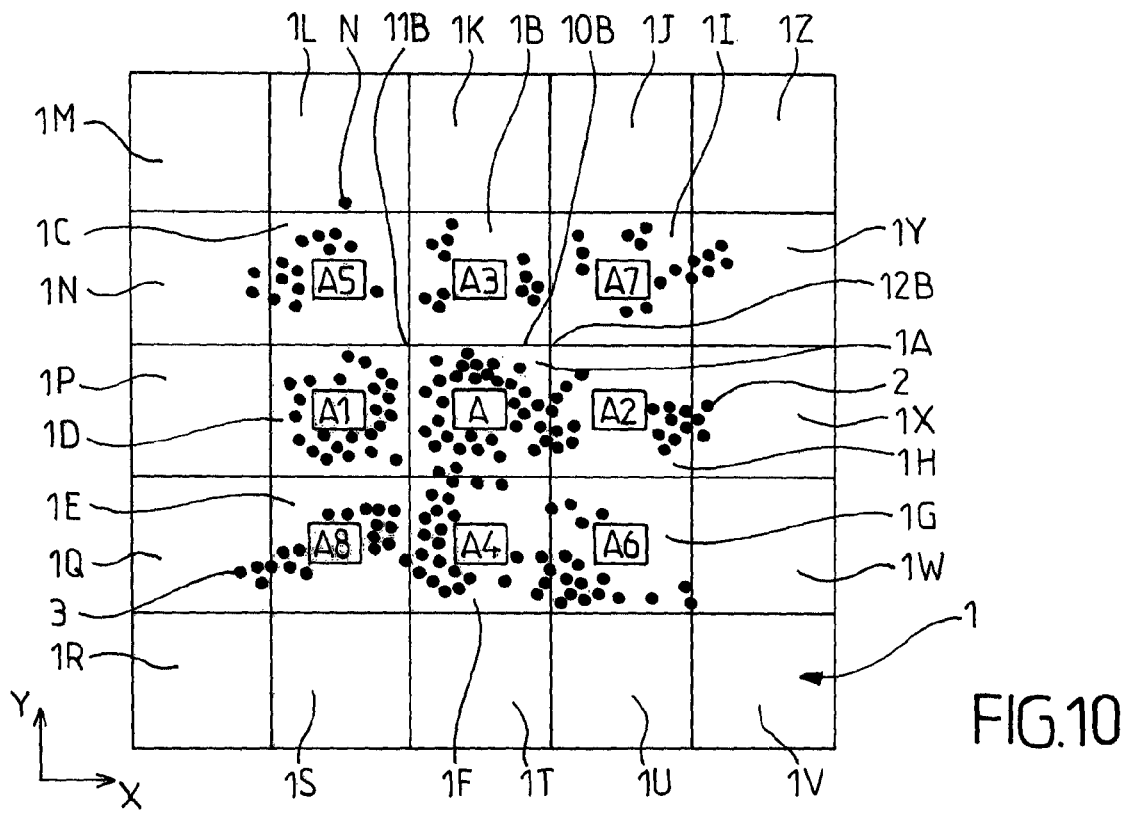
FIGS. 10 and 11 illustrate the decreasing of the virtual space of a graphical user interface in accordance with the invention, following the disappearance of a certain number of pictograms (represented by a circle in FIG. 13, while the pictograms still present are represented by solid discs, the portion of the virtual space which disappears, so as to reduce the size of the virtual space, being represented by broken fines).
Figure 11:
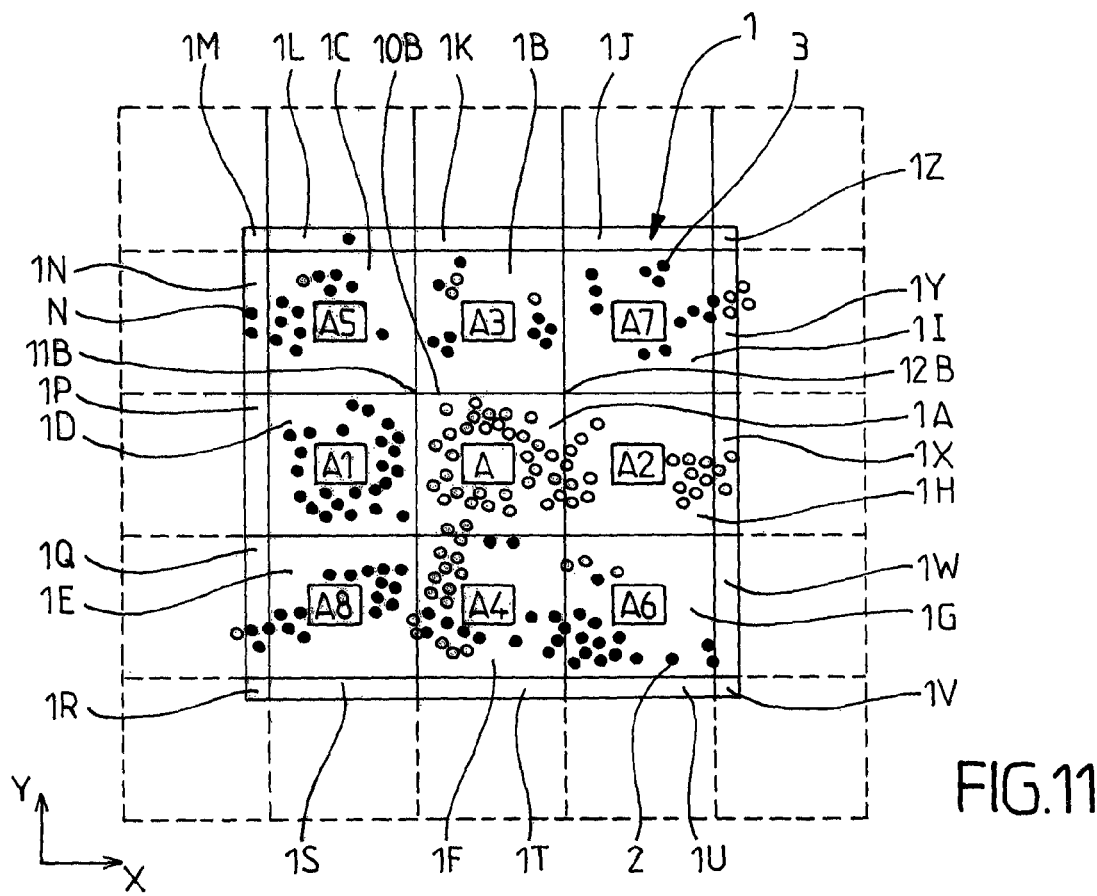
Figure 12:
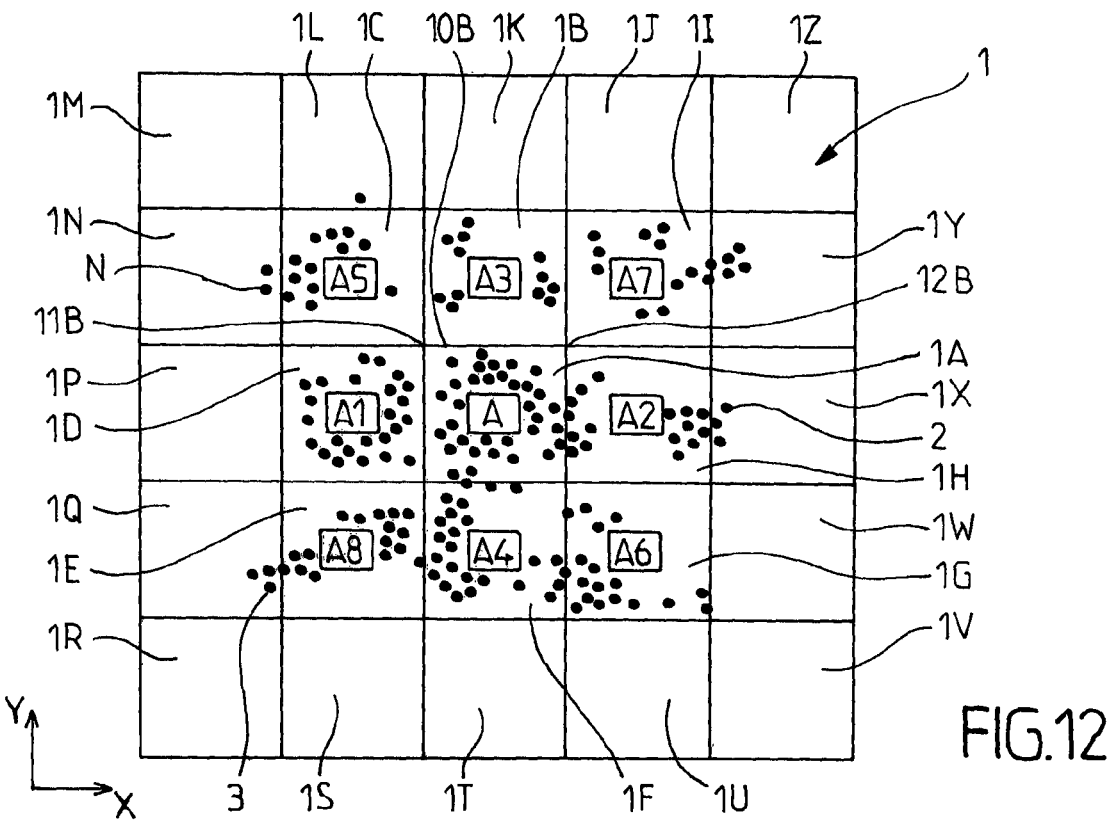
FIGS. 12 and 13 illustrate another example of the decreasing of the virtual space of a graphical user interface in accordance with the invention.
Figure 13:
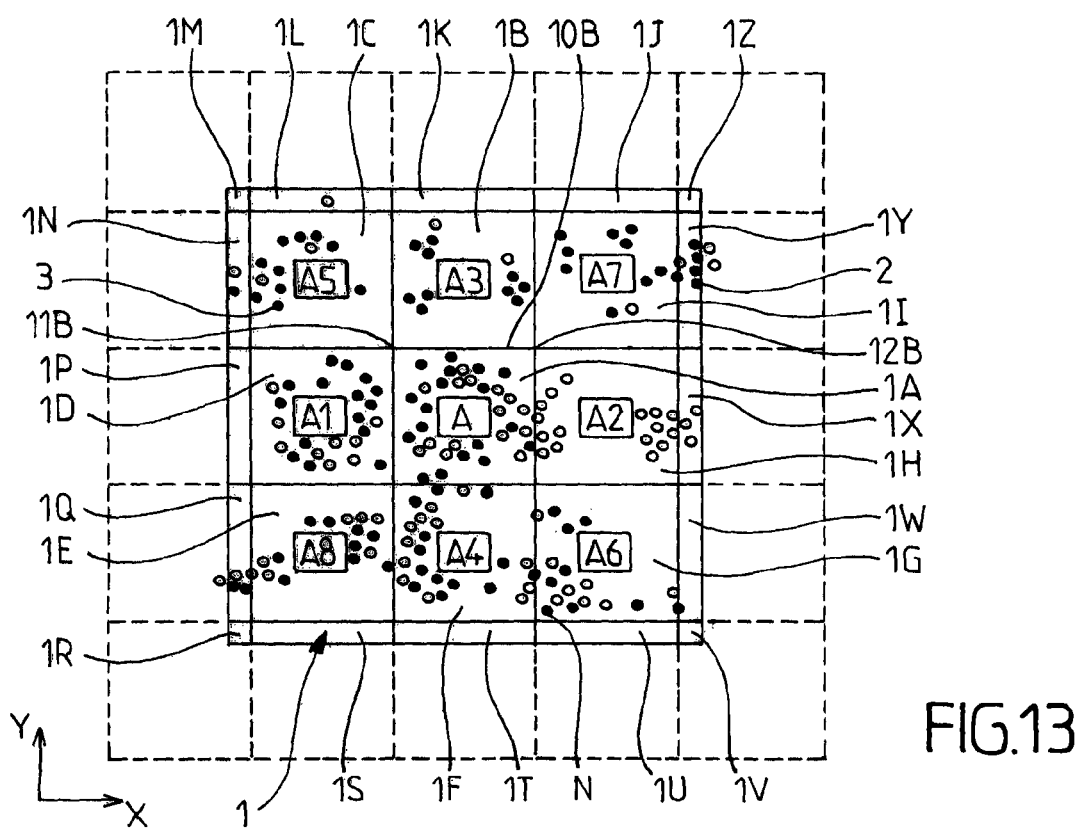

Preferably, the size of the virtual space 1 is made to decrease progressively as and when pictograms disappear. FIGS. 10 and 11 illustrate such a phenomenon of reduction of the size of the virtual space 1. In this example, the peripheral tiles 1M, 1N, 1P, 1Q, 1R, 1S, 1T, 1U, 1V, 1W, 1X, 1Y, 1Z, 1J, 1K, 1L see their size reduce concentrically and simultaneously.

Preferably, the size of the virtual space 1 is therefore also made to decrease homothetically, so that the virtual space 1 permanently retains one and the same form (advantageously square) and that only its dimensions change.

The invention also relates as such to a method, preferably automatic, for administering a graphical user interface which preferably conforms to the above description, that is to say which can be used simultaneously by remote users each having at least one display screen, said graphical interface comprising a virtual space 1 as well as a plurality of pictograms 2, 3 . . . N respectively associated with each of said users, each pictogram being designed to appear in said virtual space 1 and disappear therefrom under the control of the user with whom it is associated, said virtual space 1 and the pictograms 2, 3 . . . N appearing therein being designed to be displayed on the screens available to the users.

As explained previously in relation to the description of the graphical user interface, the operation of which advantageously corresponds to the present administration method, said method comprises a step for adjusting the size of the virtual space 1, in which said size is varied according to the number of pictograms 2, 3 . . . N appearing in said virtual space 1.

All of the preceding description concerning the graphical user interface is obviously also valid for the corresponding administration method.

The invention finally relates to a computer program comprising a computer program code means suitable for executing the steps of a method in accordance with the preceding description, when said program is run on a computer or equivalent ("smartphone", touch tablet, etc.).

The invention also relates to such a computer program implemented on a computer-readable medium, as well as a medium that can be read by a computer and on which such a program is stored. Here again, the term "computer" should be considered in its widest sense and equally designates a conventional personal computer and a "smartphone" or a graphics tablet for example.

The invention further relates to a medium that can be read by a computer and on which such a program is stored.

The invention thus makes it possible to obtain a graphical user interface which is particularly user-friendly and ergonomical, in as much as the graphical user interface concerned has an open-ended nature enabling it to be adapted to the number of instantaneous users using the interface, even if this number is very high and changes rapidly, while retaining the uniqueness of the user interface and its ergonomics. The graphical user interface according to the invention thus makes it possible to set up, for example, public virtual events (rebroadcasting of concerts for example) by permanently adapting the interface to the actual influx of users.

In a way, the graphical user interface according to the invention relies in particular, in its most advantageous form, on a fractal demultiplication of application icons, such that each application can be multiplied to infinity, and thus be easy to access by the users, without losing the collaborative uniqueness of each application. In other words, the "screens" are multiplied while keeping the same collaborative flow. The graphical user interface therefore exhibits a character which is "intelligent" and open-ended, since it is capable in particular of being automatically redimensioned according to the spatial density of the pictograms representing the users.

INDUSTRIAL APPLICABILITY

The industrial application of the invention lies in the design and use of graphical user interfaces.

The invention claimed is:

1. A system comprising:
a memory storing instructions; and
a processor coupled to the memory and configured by the instructions to:
generate a graphical user interface which can be used simultaneously by remote users each having at least one display screen, said graphical user interface comprising a virtual space (1) as well as a plurality of pictograms (2, 3 . . . N) respectively associated with each of said users, each pictogram being designed to appear in said virtual space (1) and disappear therefrom under the control of the user with whom it is associated, said virtual space (1) and the pictograms (2, 3 . . . N) appearing therein being designed to be displayed on the screens available to the users, a size corresponding to a two-dimensional area of the virtual space (1) varying according to the number of pictograms (2, 3 . . . N) appearing in said virtual space (1), so as to ensure an automatic regulation of the ratio between the number of pictograms (2, 3 . . . N) appearing in the virtual space (1) and the size thereof, said graphical user interface further comprising at least one graphical object (A) positioned in said virtual space (1) and said at least one graphical object (A) being formed by a non-active icon associated with a computer application able to provide a function or a service to each user whose associated pictogram (2, 3 . . . N) is separated from said graphical object (A) by a distance less than or equal to a predetermined value, the positioning of a user's pictogram (2, 3 . . . N) at a distance from the graphical object (A) less than or equal to said predetermined value causing transformation of the graphical object (A) formed by the non-active icon into a viewing window broadcasting audiovisual or sound programme, said viewing window being visible to said user on his or her display screen, said graphical user interface being designed to generate, when the number of pictograms (2, 3 . . . N) which are separated from said graphical object (A) by a distance less than or equal to said predetermined value exceeds a threshold value, at least one copy (A2-A12) of said graphical object (A), said at least one copy (A2-A12) having the same properties as said graphical object (A).

2. The system according to claim 1, in which each pictogram (2, 3 . . . N) appearing in said virtual space (1) is designed to be able to be moved within said virtual space (1) by the user with whom it is associated.

3. The system according to claim 2, in which said interface is designed for each pictogram (2, 3 . . . N) to be able to be moved by drag-and-drop.

4. The system according to claim 1, in which the size of the virtual space (1) varies progressively according to the number of pictograms (2, 3 . . . N) appearing in said virtual space (1).

5. The system according to claim 1, in which the size of the virtual space (1) increases when the number of pictograms (2, 3 . . . N) appearing in said virtual space (1) increases, and decreases when the number of pictograms (2, 3 . . . N) appearing in said virtual space (1) decreases.

6. The system according to claim 1, in which said interface comprises at least one graphical object (A) positioned in said virtual space (1), and said interface is designed to trigger, for the attention of each user whose associated pictogram (2, 3 . . . N) is separated from said graphical object (A) by a distance less than or equal to a predetermined value, an action affecting each of said users.

7. The system according to claim 6, in which said action affecting each of said users comprises one or more of the elements from the following list:
broadcasting, for the attention of said users, of an audiovisual or sound program;

access to a computer game enabling said users to play together;

setting up of a chat channel enabling said users to chat with one another;

setting up of a communication channel enabling said users to exchange data files with one another;

setting up of a communication channel enabling said users to set up collaborative document publishing;

activation of an application enabling an exchange or an interaction or a collaboration between a number of users (two or more);

access to a purchase/sales service.

8. The system according to claim 6, in which the size of the virtual space (1) varies also according to the number of pictograms (2, 3 . . . N) which are separated from said graphical object (A) by a distance less than or equal to said predetermined value.

9. The system according to claim 6, in which said interface is designed to generate at least one copy (A2-A12) of said graphical object (A) when the number of pictograms (2, 3 . . . N) which are separated from said graphical object A by a distance less than or equal to said predetermined value exceeds a threshold value, said copy (A2-A12) being positioned at a distance from said graphical object.

10. The system according to claim 1, in which said virtual space (1) is two-dimensional.

11. The system according to claim 10, in which said virtual space (1) is formed by at least one first individual polygonal tile (1A), the size of the virtual space (1) being designed to increase by the generation of at least one second individual polygonal tile (1B-1Z) adjacent to said first individual polygonal tile (1A).

12. The system according to claim 11, in which said second individual polygonal tile (1B) has at least one side (10B) or one vertex (11B, 12B) in common with said first individual polygonal tile (1A).

13. The system according to claim 11, in which said at least one second individual polygonal tile (1B-1Z) is generated progressively according to the number of pictograms appearing in said first individual polygonal tile.

14. The system according to claim 1, in which each of said pictograms constitutes a graphical avatar representing the user with whom it is associated.

15. A method, comprising:

administering a graphical user interface which can be used simultaneously by remote users each having at least one display screen, said graphical interface comprising a virtual space (1) as well as a plurality of pictograms (2, 3 . . . N) respectively associated with each of said users, each pictogram (2, 3 . . . N) being designed to appear in said virtual space (1) and disappear therefrom under the control of the user with whom it is associated, said virtual space and the pictograms (2, 3 . . . N) appearing therein being designed to be displayed on the screens available to the users; and adjusting a size corresponding to a two-dimensional area of the virtual space (1) in which said size is varied according to the number of pictograms (2, 3 . . . N) appearing in said virtual space (1), so as to ensure an automatic regulation of the ratio between the number of pictograms (2, 3 . . . N) appearing in the virtual space (1) and the size thereof, said graphical user interface further comprising at least one graphical object (A) positioned in said virtual space (1) and said at least one graphical object (A) being formed by a non-active icon associated with a computer application able to provide a function or a service to each user whose associated pictogram (2, 3 . . . N) is separated from said graphical object (A) by a distance less than or equal to a predetermined value, the positioning of a user's pictogram (2, 3 . . . N) at a distance from the graphical object (A) less than or equal to said predetermined value causing transformation of the graphical object (A) formed by the non-active icon into a viewing window broadcasting audiovisual or sound programme, said viewing window being visible to said user on his or her display screen, said graphical user interface being designed to generate, when the number of pictograms (2, 3 . . . N) which are separated from said graphical object (A) by a distance less than or equal to said predetermined value exceeds a threshold value, at least one copy (A2-A12) of said graphical object (A), said at least one copy (A2-A12) having the same properties as said graphical object (A).

16. Computer program embodied in a non-transitory computer-readable medium and comprising a computer program code means which, when executed by a computer, cause the computer to execute the steps of a method in accordance with claim 15.

17. Computer program according to claim 16 implemented on a non-transitory computer-readable medium.

18. Non-transitory computer readable medium that can be read by a computer and on which is stored a program in accordance with claim 16.

* * * * *